(12) United States Patent
Salik et al.

(10) Patent No.: US 12,511,467 B2
(45) Date of Patent: *Dec. 30, 2025

(54) INTEGRATED CIRCUIT LAYOUT VALIDATION USING MACHINE LEARNING

(71) Applicant: Taiwan Semiconductor Manufacturing Company Limited, Hsinchu (TW)

(72) Inventors: Rachid Salik, Sunnyvale, CA (US); Chin-Chang Hsu, New Taipei (TW); Cheng-Chi Wu, Hsinchu (TW); Chien-Wen Chen, Hsinchu (TW); Wen-Ju Yang, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,245

(22) Filed: Jan. 17, 2024

(65) Prior Publication Data
US 2024/0152679 A1 May 9, 2024

Related U.S. Application Data

(63) Continuation of application No. 17/233,699, filed on Apr. 19, 2021, now Pat. No. 11,914,941, which is a
(Continued)

(51) Int. Cl.
*G06F 30/398* (2020.01)
*G06F 30/27* (2020.01)
(Continued)

(52) U.S. Cl.
CPC .......... *G06F 30/398* (2020.01); *G06F 30/27* (2020.01); *G06N 20/00* (2019.01); *G06T 7/0004* (2013.01);
(Continued)

(58) Field of Classification Search
CPC ... G06F 30/00–398; G06F 2111/00–20; G06F 2113/00–20; G06F 2115/00–12; G06F 2117/00–12; G06F 2119/00–22
See application file for complete search history.

(56) References Cited

U.S. PATENT DOCUMENTS

| 7,440,605 B2 * | 10/2008 | Sasa ...................... G06T 7/0002 |
| | | 382/141 |
| 7,973,287 B2 * | 7/2011 | Craig ...................... G01T 1/167 |
| | | 250/370.03 |

(Continued)

OTHER PUBLICATIONS

M. Shin et al., "Accurate lithography hotspot detection using deep convolutional neural networks," J. Micro/nanolithography, MEMS, and MOEMS, vol. 15, No. 4, Oct.-Dec. 2016, 14 pages. (Year: 2016).*

*Primary Examiner* — Leigh M Garbowski
(74) *Attorney, Agent, or Firm* — Jones Day

(57) ABSTRACT

Systems, methods, and devices are described herein for integrated circuit (IC) layout validation. A plurality of IC patterns are collected which include a first set of patterns capable of being manufactured and a second set of patterns incapable of being manufactured. A machine learning model is trained using the plurality of IC patterns. The machine learning model generates a prediction model for validating IC layouts. The prediction model receives data including a set of test patterns comprising scanning electron microscope (SEM) images of IC patterns. Design violations associated with an IC layout are determined based on the SEM images and the plurality of IC patterns. A summary of the design violations is provided for further characterization of the IC layout.

20 Claims, 11 Drawing Sheets

Related U.S. Application Data continuation of application No. 16/572,189, filed on Sep. 16, 2019, now Pat. No. 11,010,529.

(51) Int. Cl.
*G06N 20/00* (2019.01)
*G06T 7/00* (2017.01)
*G06F 119/18* (2020.01)

(52) U.S. Cl.
CPC .............. *G06F 2119/18* (2020.01); *G06T 2207/10061* (2013.01); *G06T 2207/30148* (2013.01)

(56) References Cited

U.S. PATENT DOCUMENTS

| | | | |
|---|---|---|---|
| 8,136,056 B2 * | 3/2012 | Scheffer | G06F 30/398 |
| | | | 716/54 |
| 8,539,421 B2 * | 9/2013 | Agarwal | G06F 30/398 |
| | | | 716/132 |
| 10,365,617 B2 * | 7/2019 | Lin | G05B 13/0265 |
| 10,546,085 B2 * | 1/2020 | Hu | G03F 7/70433 |
| 10,546,766 B2 * | 1/2020 | Matsuo | H01L 21/67288 |
| 11,010,529 B2 | 5/2021 | Salik et al. | |
| 11,914,941 B2 * | 2/2024 | Salik | G06T 7/001 |
| 2012/0227017 A1 | 9/2012 | Abdo | |
| 2013/0031518 A1 | 1/2013 | Robles et al. | |
| 2018/0300434 A1 | 10/2018 | Hu et al. | |
| 2019/0384236 A1 | 12/2019 | Lin et al. | |
| 2020/0050099 A1 | 2/2020 | Su et al. | |
| 2021/0241449 A1 | 8/2021 | Wang et al. | |

* cited by examiner

INTEGRATED CIRCUIT LAYOUT VALIDATION USING MACHINE LEARNING

PRIORITY CLAIM

The present application is a continuation of U.S. application Ser. No. 17/233,699, filed Apr. 19, 2021, which is a continuation of U.S. application Ser. No. 16/572,189, filed Sep. 16, 2019, now U.S. Pat. No. 11,010,529, issued May 18, 2021, the contents of each of which is incorporated herein in their entirety.

FIELD

The technology described in this disclosure relates generally to electronic systems and more particularly integrated circuit layout validation using machine learning.

BACKGROUND

Integrated circuits (ICs) are manufactured using a number of machines and/or automated manufacturing processes. IC layouts define the design of the IC. At times, a designed IC may not comply with the design requirements. Checking or validating that the designed IC layout complies with design requirements can help avoid manufacturing and/or operational issues. The more intricate of a design, the more difficult it becomes to validate the designed IC layout.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
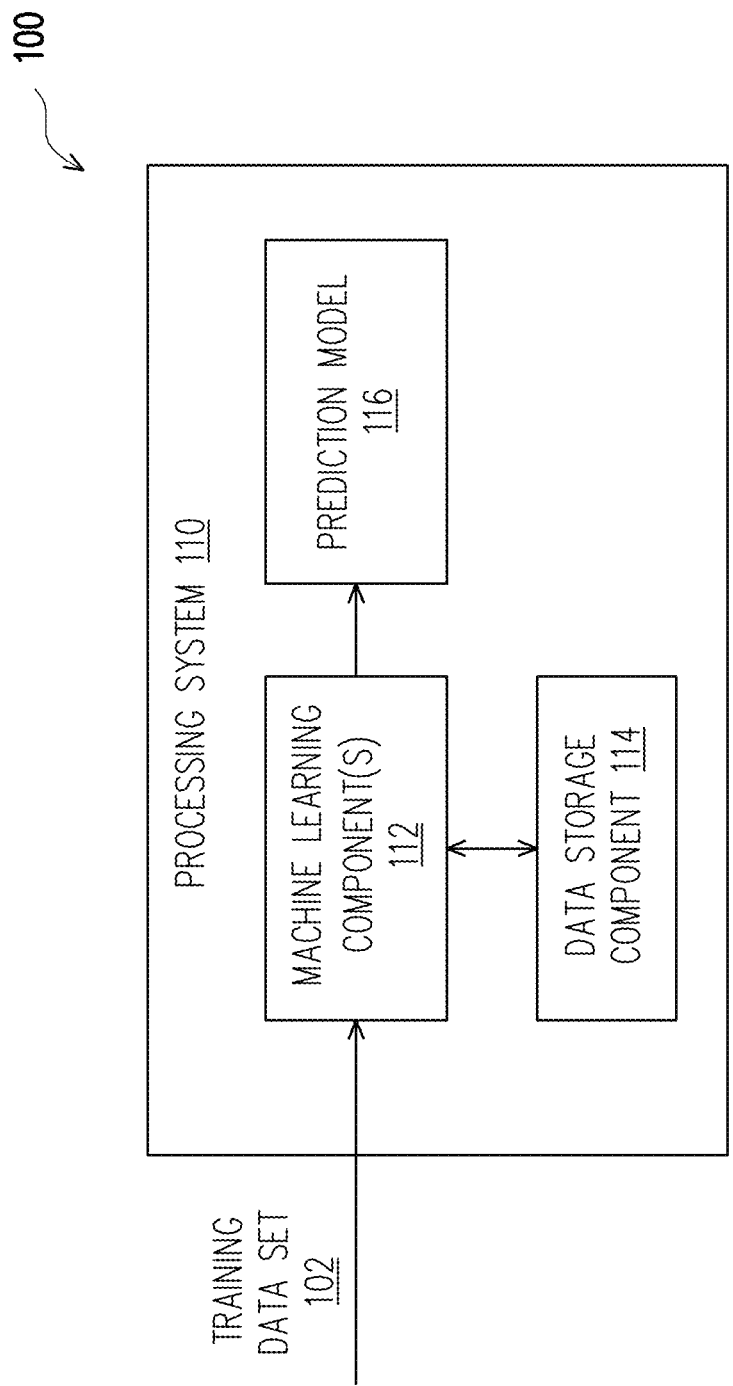
FIG. 1 illustrates an example system that processes a dataset and generates a prediction model used to identify design violations of an IC layout in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Validation of IC layouts can increase in complexity the more complex the layout. Traditionally, IC layout validation involves collecting and translating of silicon data into one or more design rules (e.g., design rule manual (DRM)). The rules are then translated into design rule check (DRC) programming code to check the layout geometry. The DRC programming code is used to validate an IC layout design for compliance with design requirements. With two different translations (e.g., (i) design requirements to rule wording and (ii) rule wording to DRC code), there are a number of opportunities for design information to be lost in translation. The IC layout validation is only as good as the DRC code used for validation. In other words, if the DRC code has missing design requirements, there is no way to identify if the IC layout meets such requirements. As described herein, a trained machine learning model can be used to perform IC layout validation.

Artificial intelligence is the ability of a computing device to analyze collected data and reach conclusions and/or make decisions using such data. Machine learning is a common method of creating artificial intelligence. With machine learning, a computing device obtains and applies its knowledge to make decisions without being explicitly programmed by a series of rules. For example, machine learning component(s) can be trained using large datasets and generate an output based on that dataset. In connection with the present disclosure, a dataset of a number of IC design layouts (e.g., good design layouts and bad design layouts) is assembled. The dataset is provided to machine learning component(s) for training. The trained machine learning component(s) generates a prediction model that is used to evaluate images of a real product layout and identify any design violations of an IC layout against those images.

FIG. 1 illustrates an example system 100 that processes a dataset 102 and generates a prediction model 116 used to identify design violations of an IC layout in accordance with various embodiments of the present disclosure. The system 100 includes one or more processing systems 110. Processing system 110 includes machine learning component(s) 112. Machine learning component(s) 112 receives training dataset 102 (e.g., good IC layouts and bad IC layouts). The training dataset 102 may be received by the processing system 110 via a communications network, e.g., an Internet, an intranet, an extranet, a local area network ("LAN"), a wide area network ("WAN"), a metropolitan area network ("MAN"), a virtual local area network ("VLAN"), and/or any other network. The training dataset 102 may also be received via a wireless, a wired, and/or any other type of connection. Machine learning component(s) 112 is trained by evaluating the training dataset 102 that is annotated to achieve a particular purpose (e.g., determine whether a layout is a good design or a bad design). The training dataset 102 has a number of good design examples and bad design examples that the machine learning component(s) 112 uses to evaluate an input design against. Once trained, machine learning component(s) 112 generates a prediction model 116 that preforms IC layout validation based on the training dataset 102.

The prediction model 116 can be implemented as a neural network that is trained using training dataset 102 based on characteristics of layouts within the dataset and their corresponding identifications as good or bad designs. The neural network utilizes iterative learning. Each layout within training dataset 102 is provided to machine learning component(s) 112 and its corresponding features are assigned to input nodes of the neural network. Weights are assigned to each input node and adjusted accordingly to achieve a particular output. For example, the features of a good layout can be fed in as inputs and assigned various weights. The weights are adjusted to ensure an output indication of a "good" layout. During the training process, the weights are adjusted for each layout indicated as "good" to ensure that the output indicates that the layout is good. This process is repeated for each of the bad layouts within training dataset 102. The features of a bad layout are fed into the neural network as inputs and the weights previously adjusted for good layouts are then modified to ensure the output of a bad layout indicates the layout is bad. The weights are iteratively adjusted for every bad layout within training dataset 102. For ease of understanding, the training process is described to occur serially with good layouts first and bad layouts second. It is noted, however, that such training can occur simultaneously and any combination of inputs are within the scope of this disclosure. Once the weights are finalized for both good and bad layout indications, the training of machine learning component(s) 112 is complete. Prediction model 116 contains a set of weights that are no longer modified based on the input. In other words, the weights determined during training are applied to any input fed into prediction model 116. Prediction model 116 outputs a characterization of a good layout or a bad layout based on those weights, as described in more detail in FIGS. 2-4.

Processing system 110 may be implemented using software, hardware and/or any combination of both. Processing system 110 may also be implemented in a personal computer, a laptop, a server, a mobile telephone, a smartphone, a tablet, and/or any other type of device and/or any combination of devices. The machine learning component(s) 112 may perform execution, compilation, and/or any other functions on the received dataset 102 as well as machine learning functions, as discussed in further detail below. Processing system 110 also includes a data storage component 114. The data storage component 114 may be used for storage of data processed by processing system 110 and may include any type of memory (e.g., a temporary memory, a permanent memory, and/or the like).

Figure 2:
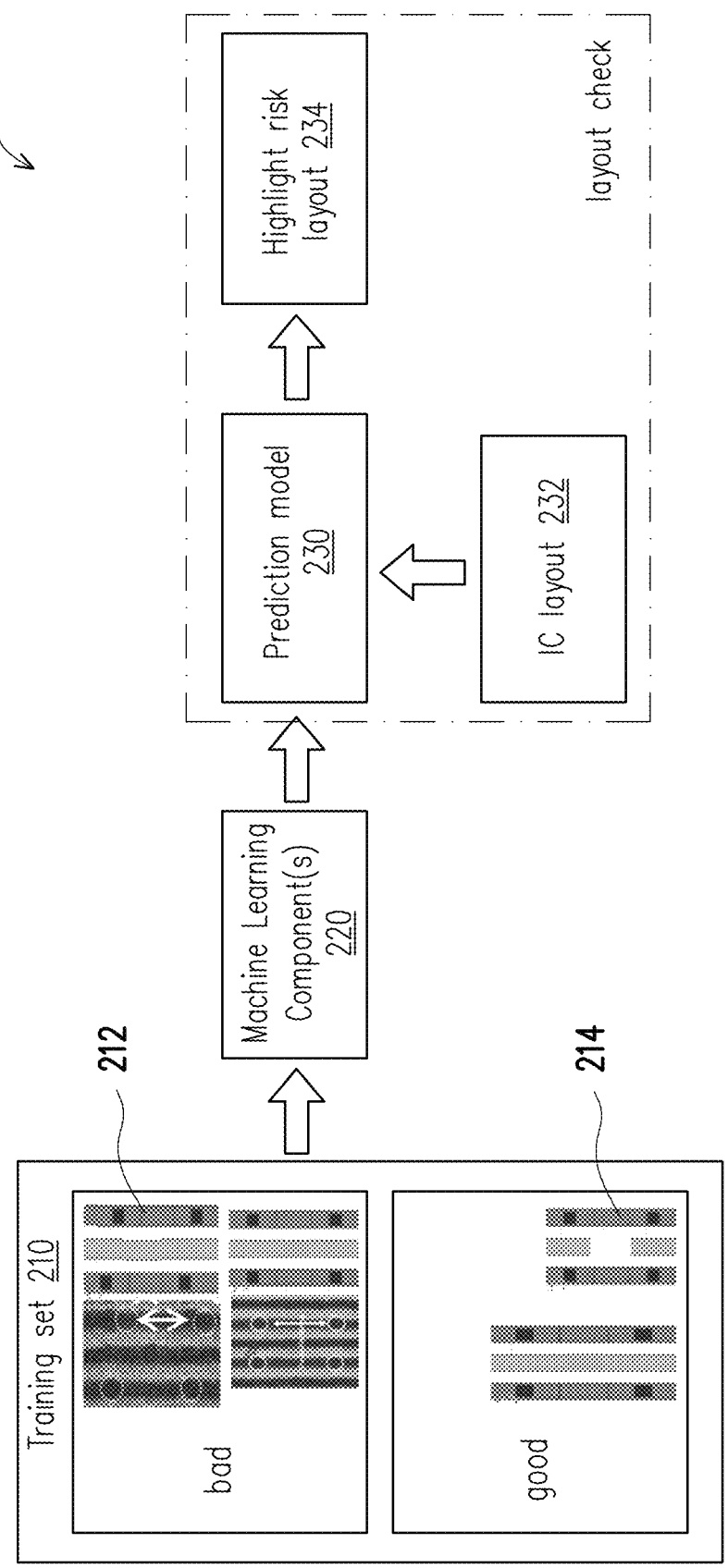
FIG. 2 is an exemplary flow diagram illustrating a model checker for IC layout validation in accordance with various embodiments of the present disclosure.

FIG. 2 is an exemplary flow diagram 200 illustrating a model checker for IC layout validation in accordance with various embodiments of the present disclosure. A training dataset 210 is assembled from a large number of IC layout patterns (e.g., 100, 1000, 10000) including bad patterns 212 and good patterns 214. It is noted that any number of IC layout patterns can be used as training dataset 210 and are within the scope of the present disclosure. The greater the number of IC layout patterns within training dataset 210, the higher confidence level of predictions generated by prediction model 230. The more IC layout patterns within training dataset 210, however, can require increased computing resources and/or computing pattern. A balance between the level of confidence that is acceptable for a given design can be balanced against the computing resources and/or computing power available for machine learning component(s) 220 and/or prediction model 230. A pattern is a two-dimensional (2D) representation of planar geometric shapes that symbolize various material layers of an IC. Good patterns 214 are capable of being manufactured. Bad patterns 212 are not capable of being manufactured due to some flaw such as a defect hotspot (e.g., damaged ICs caused by excessive current flow). The labeling of bad patterns 212 and good patterns 214 is determined based upon scanning electron microscope (SEM) images and processed silicon data of real IC devices. Training dataset 210 is provided to machine learning component(s) 220 for processing. In other words, machine learning component(s) 220 undergoes supervised learning (e.g., human intervention to validate whether an image or layout is a good design or a bad design) by receiving training dataset 210. Machine learning component(s) 220 generate a prediction model 230 that can be used for IC layout validation. Prediction model 230 receives an IC layout 232 (e.g., an IC layout generated for a particular purpose) to be validated. IC layout 232 can be, for example, a schematic layout of an IC device. Prediction model 230 processes IC layout 232 and identifies any design violations (e.g., particular design aspects of IC layout 232 that do not comply with design requirements) or risks associated with the IC layout 232 (e.g., particular design aspects that might cause manufacturing or operational defects or prevent manufacturing of the IC layout 232).

Figure 3:
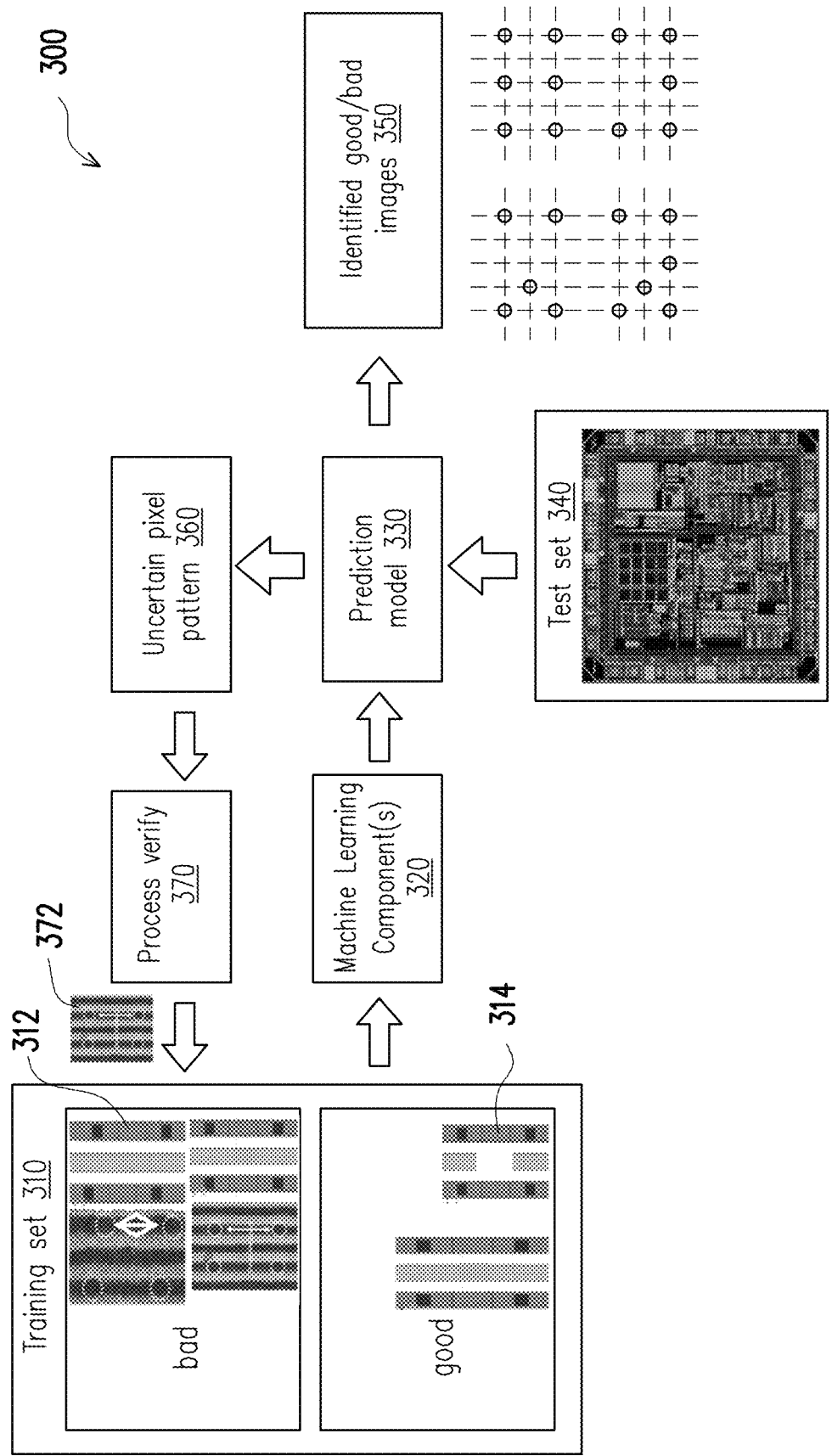
FIG. 3 is an exemplary flow diagram illustrating an image checker for IC layout validation in accordance with various embodiments of the present disclosure.

FIG. 3 is an exemplary flow diagram 300 illustrating an image checker for IC layout validation in accordance with various embodiments of the present disclosure. A training dataset 310 is assembled from a large number of IC layout patterns including bad patterns 312 and good patterns 314. A pattern is a 2D representation of planar geometric shapes that symbolize various material layers of an IC. Good patterns 314 are capable of being manufactured. Bad patterns 312 are not capable of being manufactured due to some flaw such as a defect hotspot. The labeling of bad patterns 312 and good patterns 314 is determined based upon SEM images and processed silicon data of real IC devices. Training dataset 310 is provided to machine learning component(s) 320 for processing. In other words, machine learning component(s) 320 undergo supervised learning by receiving training dataset 310. Machine learning component(s) 320 generate a prediction model 330 that can be used for IC layout validation. In the embodiment illustrated in FIG. 3, prediction model 330 receives a test dataset 340 having one or more layouts including SEM images of real IC devices already designed. Prediction model 330 processes test dataset 340 and identifies any design violations (e.g., particular design aspects of IC layouts within test dataset 340 that do not comply with design requirements) or risks associated with the test dataset 340 (e.g., particular design aspects that might cause manufacturing or operational defects or prevent manufacturing of the test dataset 340). Prediction model 330 analyzes pixel patterns of each layout within test dataset 340 and extracts image as either having a good pixel pattern or a bad pixel pattern (e.g., identified good/bad images 350).

In analyzing the images within test dataset 340, prediction model 330 also determines a confidence score by performing internal mathematical calculations using any standard statistical calculation. The confidence score numerically identifies how confident prediction model 330 is in labeling an image of test dataset 340 as good or bad. If the confidence score is low enough (e.g., below a certain threshold value), the pixel pattern of that image is assembled into a group of uncertain pixel patterns 360. The uncertain pixel patterns 360 are provided back to a team for manual process verification 370 as to whether the pixel pattern is good or bad. Once manually labeled, the new pixel pattern 372 is added to training set 310. Machine learning component(s) 320 can then use the updated training set 310 inclusive of new pixel pattern 372 to generate a new prediction model. In other words, machine learning component(s) 320 are re-trained and a prediction model is re-generated. In this example, adding new pixel pattern 372 will subsequently increase the confidence score associated with the prior uncertain pixel pattern of test dataset 340. In other words, if the prior uncertain pixel pattern of test dataset 340 was processed again by prediction model 330 (after generation of a new model using training set 310 inclusive of new pixel pattern 372), the uncertain pixel pattern would be categorized as good or bad within the identified good/bad images 350.

Figure 4:
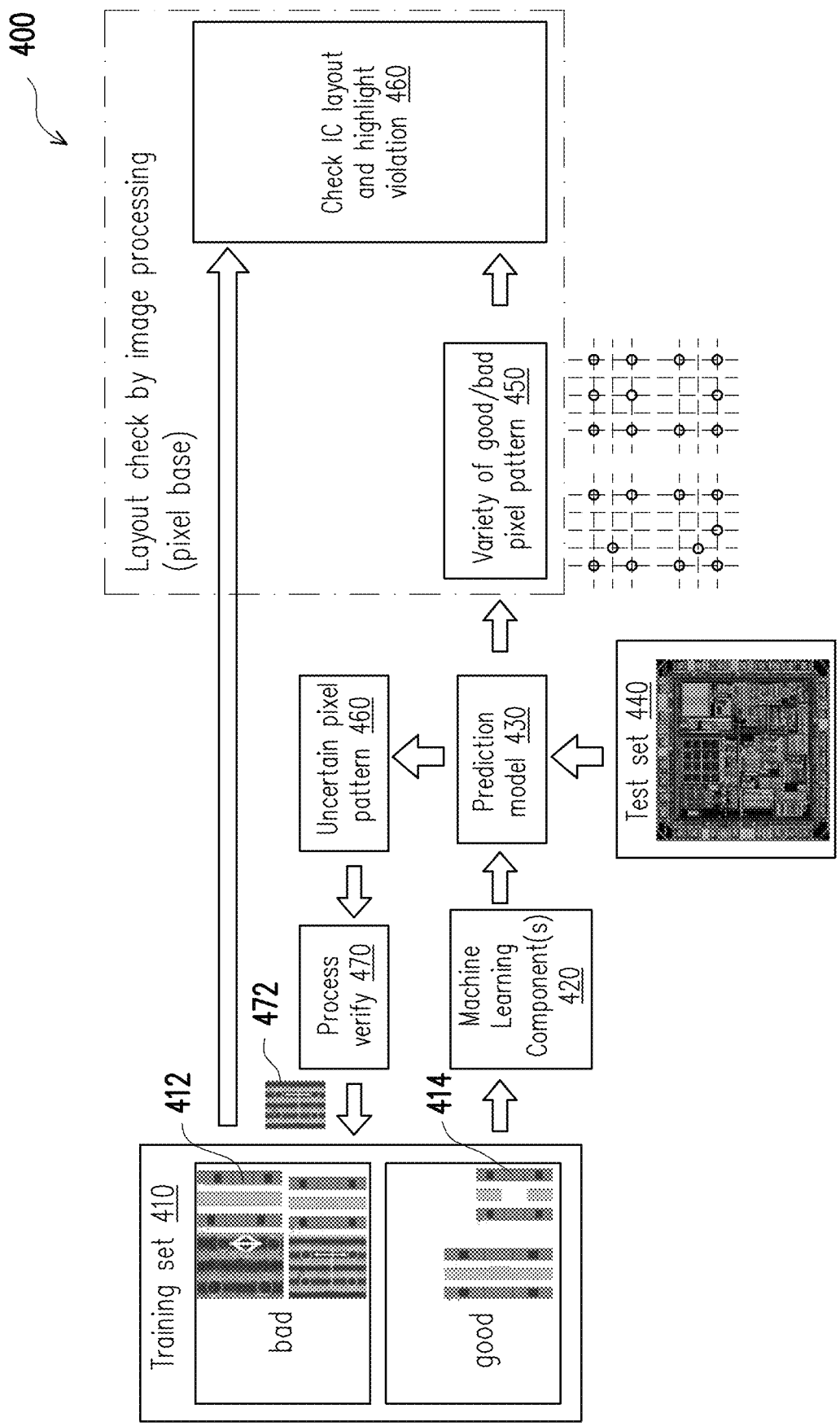
FIG. 4 is an exemplary flow diagram illustrating an image checker for IC layout validation in accordance with various embodiments of the present disclosure.

FIG. 4 is an exemplary flow diagram 400 illustrating an image checker for IC layout validation in accordance with various embodiments of the present disclosure. A training dataset 410 is assembled from a large number of IC layout patterns including bad patterns 412 and good patterns 414. A pattern is a 2D representation of planar geometric shapes that symbolize various material layers of an IC. Good patterns 414 are capable of being manufactured. Bad patterns 412 are not capable of being manufactured due to some flaw such as a defect hotspot. The labeling of bad patterns 412 and good patterns 414 is determined based upon SEM images and processed silicon data of real IC devices. Training dataset 410 is provided to machine learning component(s) 420 for processing. In other words, machine learning component(s) 420 undergo supervised learning by receiving training dataset 410. Machine learning component(s) 420 generate a prediction model 430 that can be used for IC layout validation. In the embodiment illustrated in FIG. 4, prediction model 430 receives a test dataset 440 having one or more layouts including SEM images of real IC devices already designed. Prediction model 430 processes test dataset 440 and identifies any design violations (e.g., particular design aspects of IC layouts within test dataset 440 that do not comply with design requirements) or risks associated with the test dataset 440 (e.g., particular design aspects that might cause manufacturing or operational defects or prevent manufacturing of the test dataset 440). Prediction model 430 analyzes pixel patterns of each layout within test dataset 440 and extracts image as either having a good pixel pattern or a bad pixel pattern (e.g., identified good/bad images 450).

In analyzing the images within test dataset 440, prediction model 430 also determines a confidence score. The confidence score numerically identifies how confident prediction model 430 is in labeling an image of test dataset 440 as good or bad. If the confidence score is low enough (e.g., below a certain threshold value), the pixel pattern of that image is assembled into a group of uncertain pixel patterns 460. The uncertain pixel patterns 460 are provided back to a team for manual process verification 470 as to whether the pixel pattern is good or bad. Once manually labeled, the new pixel pattern 472 is added to training set 410. Machine learning component(s) 420 can then use the updated training set 410 inclusive of new pixel pattern 472 to generate a new prediction model. In other words, machine learning component(s) 420 are re-trained and a prediction model is re-generated. In this example, adding new pixel pattern 472 will subsequently increase the confidence score associated with the prior uncertain pixel pattern of test dataset 440. In other words, if the prior uncertain pixel pattern of test dataset 440 was processed again by prediction model 430 (after generation of a new model using training set 410 inclusive of new pixel pattern 472), the uncertain pixel pattern would be categorized as good or bad within the identified good/bad images 450.

With a variety of good and bad pixel patterns 450 identified, an IC layout (e.g., design schematic) can be compared against the variety of good and bad pixel patterns 450 using image processing techniques. Design violations within the IC layout (e.g., particular aspects of the IC layout that do not comply with design requirements) can be highlighted and identified.

Figure 5:
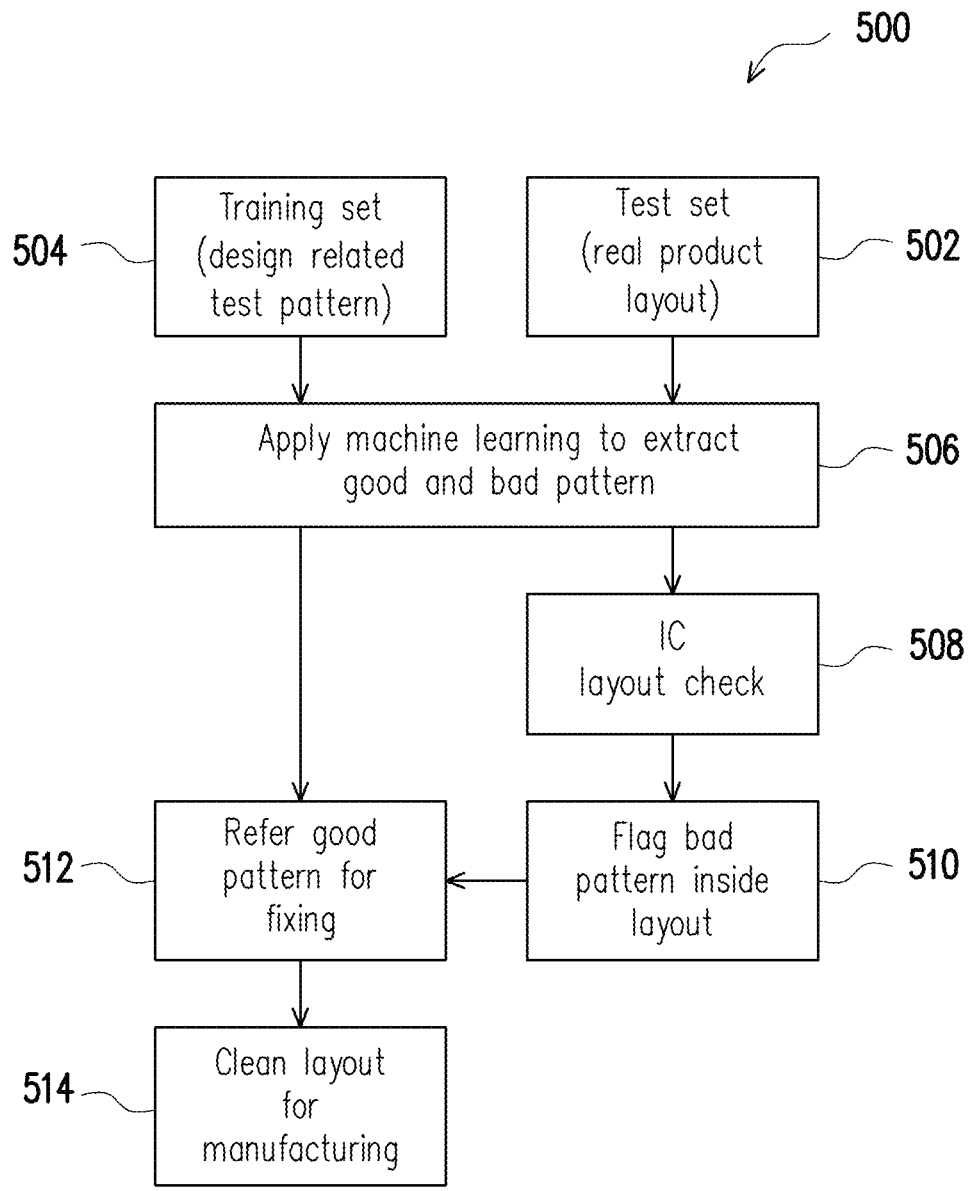
FIG. 5 is an exemplary flow chart for performing an image check of an IC layout in accordance with various embodiments of the present disclosure.

FIG. 5 is an exemplary flow chart 500 for performing an image check of an IC layout in accordance with various embodiments of the present disclosure. A training dataset 504 containing a number of design-related test patterns (e.g., design IC layouts) and a test dataset 502 containing a number of layouts including SEM images of real IC layouts already designed. Machine learning is applied, at 506, to extract good and bad pixel patterns. The IC layout is checked, at 508, against the good and bad pixel patterns as described in FIG. 4. Particular aspects of the IC layout which require fixing in order to be manufactured are identified or flagged, at 510. With those particular aspects identified, a good pixel pattern can be provided, at 512, for suggestion of fixing such aspects. The IC layout 508 is cleaned or corrected, at 514, to ready it for manufacturing.

Figure 6:
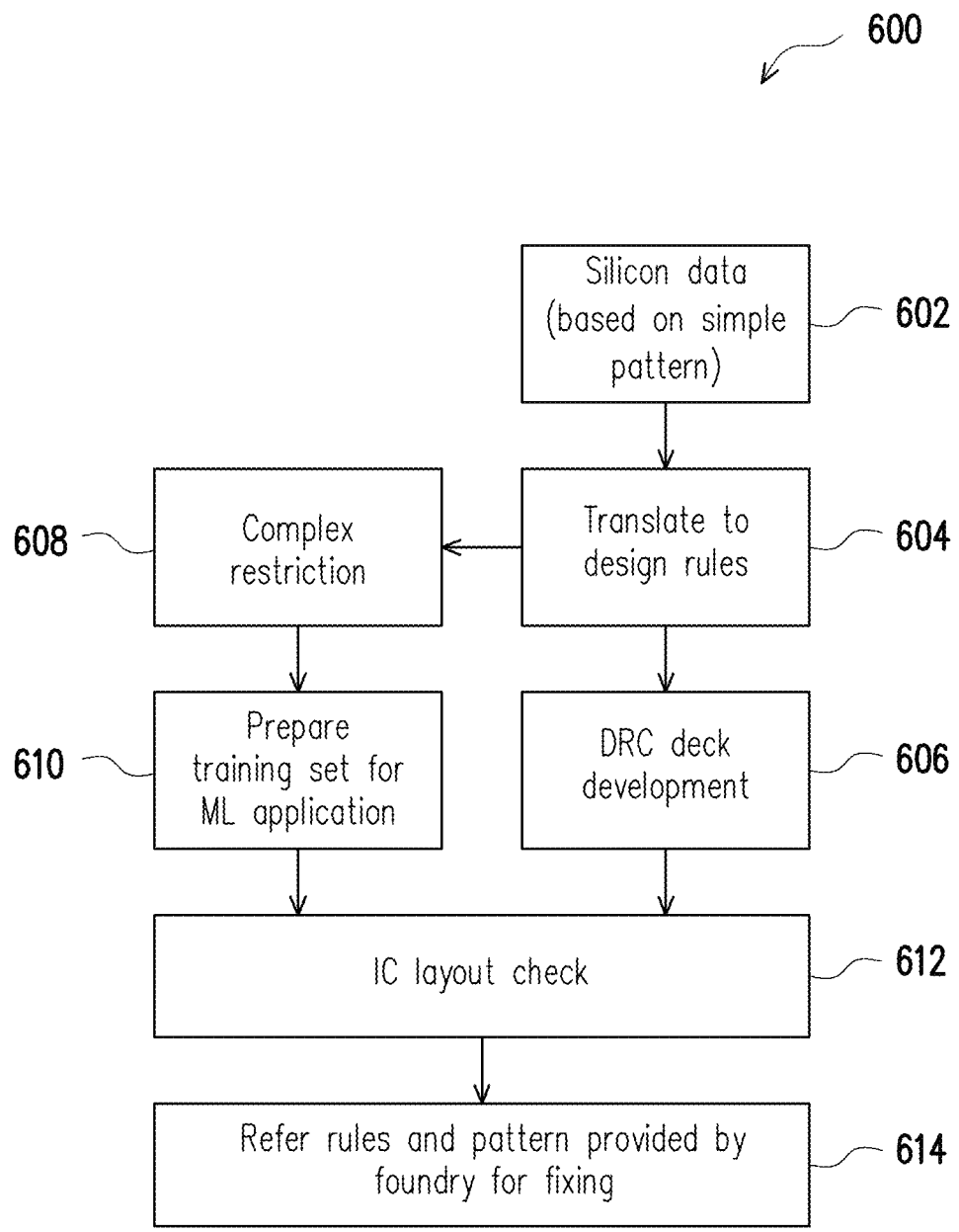
FIG. 6 is an exemplary flow chart for performing a hybrid image check of an IC layout in accordance with various embodiments of the present disclosure.

FIG. 6 is an exemplary flow chart 600 for performing a hybrid image check of an IC layout in accordance with various embodiments of the present disclosure. With a hybrid image check, an IC layout can be validated using both machine learning 608, 610 and design rule checking 602, 604, 606. Silicon data (e.g., data related to layout pattern such as layout pattern printing), based on simple patterns, is collected, at 602. That silicon data is translated, at 604, into one or more design rules. For design rules that may not be complex (e.g., minimal spacing between two metal lines), the rule wording (e.g., problems and/or comments from a human designer) is translated, at 606, into DRC code for layout geometry checking. For example, rule wording of "pitch must be 0.1 nm" is translated into a rule that can be understood by the tools and/or system setting the pitch (e.g., p=0.1). The rules which are complex (e.g., having a number of different conditions) are collected together, at 608, and are processed using machine learning, at 610, as described in detail in FIGS. 1-5. An IC layout can be validated, at 612, using both the DRC code and the identified good and bad pixel patterns from the prediction model. Any design violations can be highlighted and a manufacturing site such as a foundry can be provided, at 614, with the various rules and/or patterns that can assist with fixing such violations.

Figure 7:
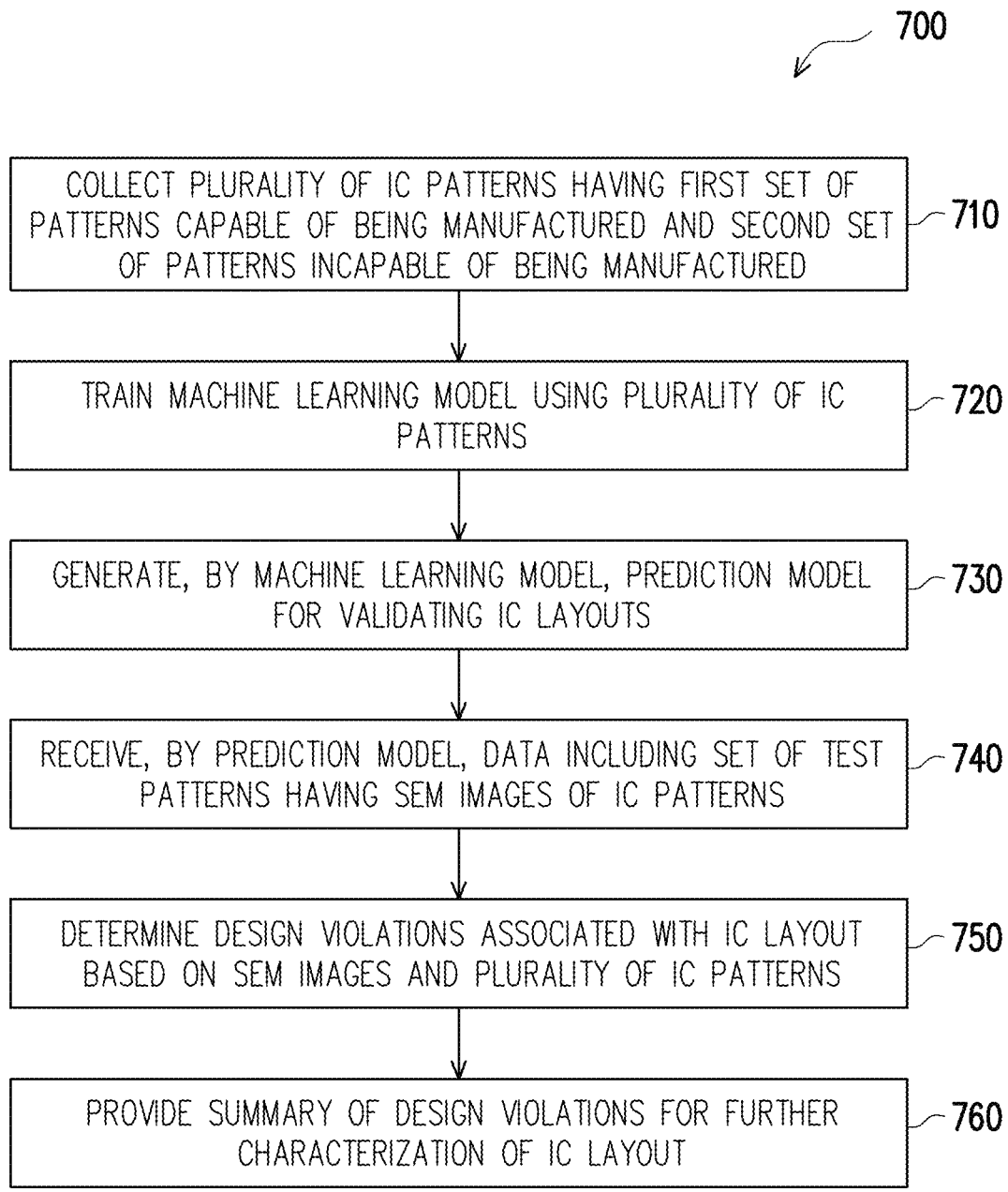
FIG. 7 is a flow chart of an exemplary method for IC layout validation in accordance with various embodiments of the present disclosure.

FIG. 7 is a flow chart 700 of an exemplary method for IC layout validation in accordance with various embodiments of the present disclosure. A plurality of IC patterns including a first set of patterns capable of being manufactured and a second set of patterns incapable of being manufactured are collected, at 710. A machine learning model is trained, at 720, using the plurality of IC patterns. A prediction model is generated, at 730, by the machined learning model for validating IC layouts. The prediction model receives, at 740, data including a set of test patterns of SEM images of IC patterns. Design violations associated with an IC layout based on the SEM images and the plurality of IC patterns are determined, at 750. A summary of the design violations is provided, at 760, for further characterization of the IC layout.

Figure 8:
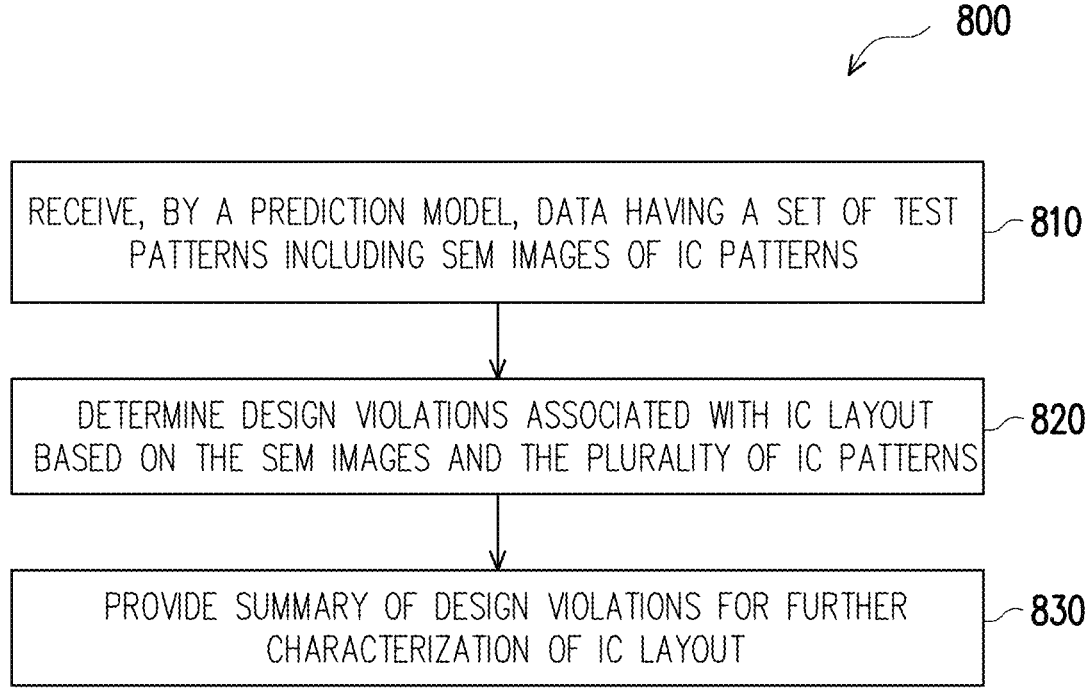
FIG. 8 is a flow chart of an exemplary method for IC layout validation in accordance with various embodiments of the present disclosure.

FIG. 8 is a flow chart 800 of an exemplary method for IC layout validation in accordance with various embodiments of the present disclosure. A prediction model receives, at 810, data having a set of test patterns that include SEM images of IC patterns. The prediction model is generated by a trained machine learning model. The trained machine learning model is trained using a plurality of IC patterns that include a first set of patterns capable of being manufactured and a second set of patterns incapable of being manufactured. Design violations associated with an IC layout based on the SEM images and the plurality of IC patterns are determined, at 820. A summary of the design violations is provided, at 830, for further characterization of the IC layout.

Figure 9:
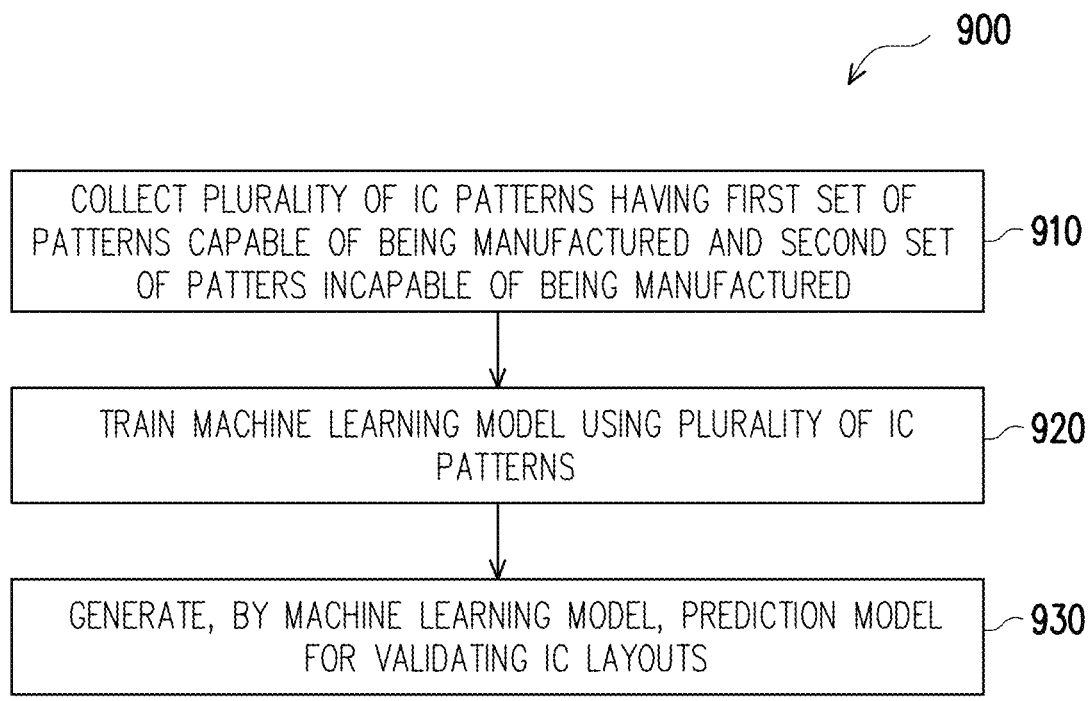
FIG. 9 is a flow chart of an exemplary method of training a machine learning model for IC layout validation in accordance with various embodiments of the present disclosure.

FIG. 9 is a flow chart 900 of an exemplary method of training a machine learning model for IC layout validation in accordance with various embodiments of the present disclosure. A plurality of IC patterns including a first set of patterns capable of being manufactured and a second set of patterns incapable of being manufactured are collected, at 910. A machine learning model is trained, at 920, using the plurality of IC patterns. The machine learning model generates, at 930, a prediction model for validating IC layouts. The prediction model is used to design violations associated with an IC layout based on a set of test patterns having SEM images of IC patterns and the plurality of IC patterns.

Figure 10:
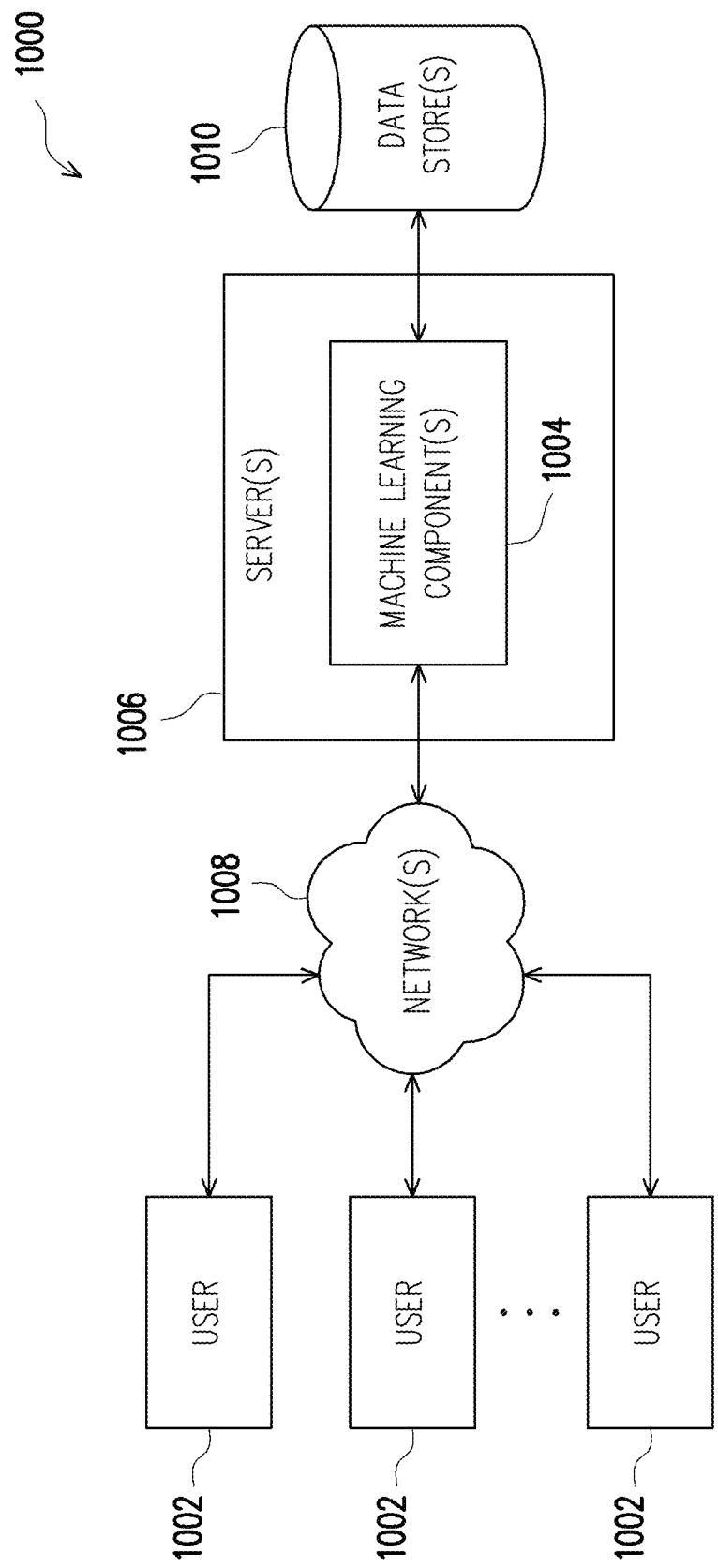
FIG. 10 illustrates an example computer-implemented environment for use in accordance with various embodiments of the present disclosure.

FIG. 10 illustrates an example computer-implemented environment 1000 wherein users 1002 can interact with machine learning component(s) 1004 for validating IC layouts as described herein, hosted on one or more servers 1006 through a network 1008. The machine learning components 1004 can assist the users 1002 with interfacing between an object-oriented modeling language based interface and a hardware description language based interface.

As shown in FIG. 10, the users 1002 can interact with the machine learning component(s) 1004 through a number of ways, such as over one or more networks 1008. One or more servers 1006 accessible through the network(s) 1008 can host the machine learning component(s) 1004. The one or more servers 1006 can also contain or have access to one or more data stores 1010 for storing data for the machine learning component(s) 1004.

Figure 11:
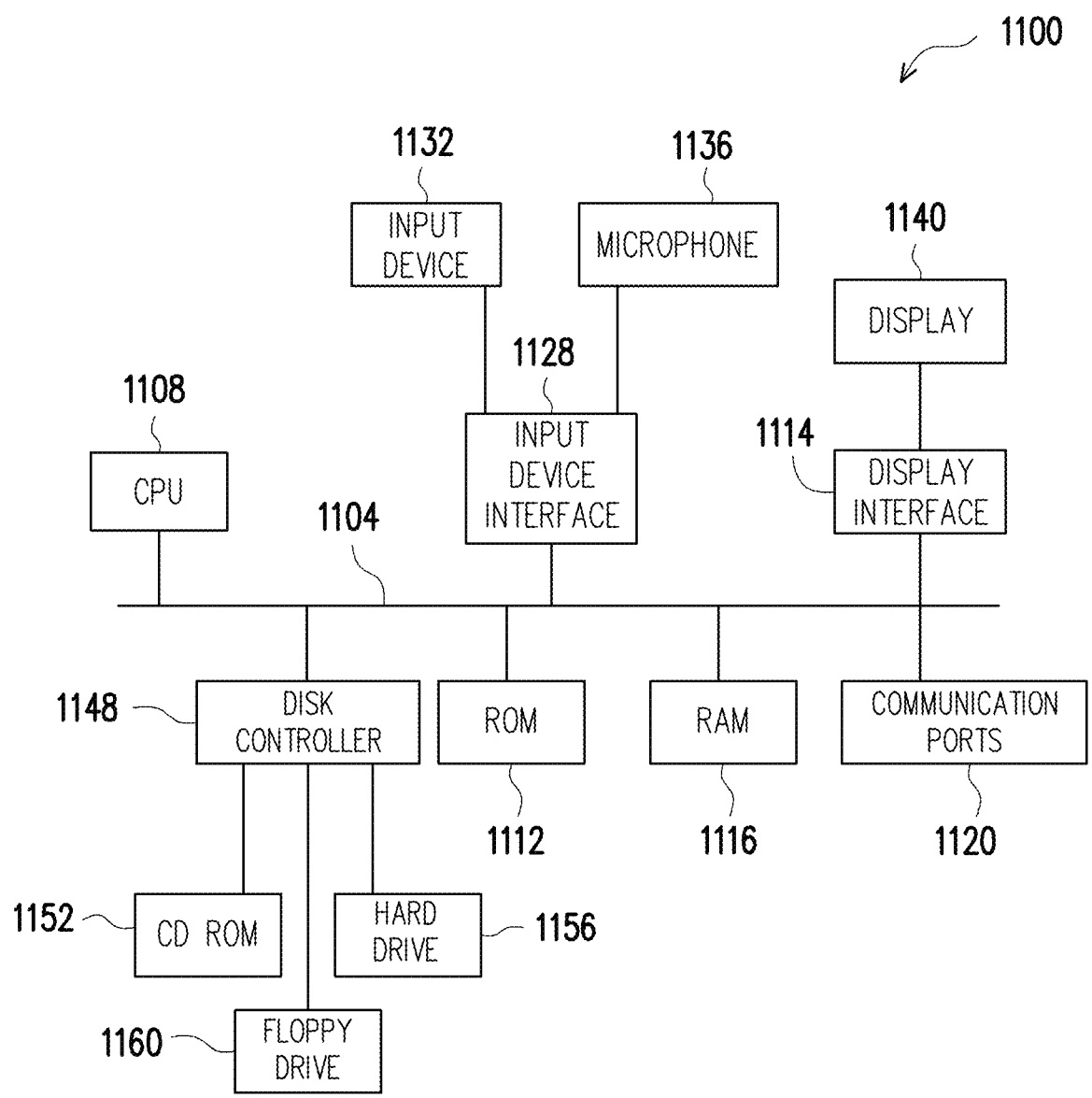
FIG. 11 is a diagram 1100 illustrating a sample computing device architecture for implementing various aspects described herein.

FIG. 11 is a diagram 1100 illustrating a sample computing device architecture for implementing various aspects described herein. A bus 1104 can serve as the information highway interconnecting the other illustrated components of the hardware. A processing system 1108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface one or more optional disk drives to the system bus 1104. These disk drives can be external or internal floppy disk drives such as 1160, external or internal CD-ROM, CD-R, CD-RW or DVD, or solid state drives such as 1152, or external or internal hard drives 1156. As indicated previously, these various disk drives 1152, 1156, 1160 and disk controllers are optional devices. The system bus 1104 can also include at least one communication port 1120 to allow for communication with external devices either physically connected to the computing system or available externally through a wired or wireless network. In some cases, the communication port 1120 includes or otherwise comprises a network interface.

To provide for interaction with a user, the subject matter described herein can be implemented on a computing device having a display device 1140 (e.g., a CRT (cathode ray tube) or LCD (liquid crystal display) monitor) for displaying information obtained from the bus 1104 to the user and an input device 1132 such as keyboard and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone 1136, or tactile feedback); and input from the user can be received in any form, including acoustic, speech, or tactile input. In the input device 1132 and the microphone 1136 can be coupled to and convey information via the bus 1104 by way of an input device interface 1128. Other computing devices, such as dedicated servers, can omit one or more of the display 1140 and display interface 1114, the input device 1132, the microphone 1136, and input device interface 1128.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Use of the various circuits and configurations as described herein can provide a number of advantages. For example, in using a trained machined learning model for IC layout validation, pattern-to-pattern checking is performed rather than design rule geometric checking (e.g., image processing is used for IC layout validation). Additionally, the IC layout validation is performed using a large number of design patterns and SEM images. With the use of a trained machine learning model, DRM wording and DRC coding can be eliminated partially or completely. Additionally, the IC layout validation with machine learning can have a much faster runtime than the traditional validation using DRM and DRC coding. Use of the trained model can also enable a process owner to develop and validate an IC layout pattern themselves.

In one embodiment, a plurality of IC patterns are collected which include a first set of patterns capable of being manufactured and a second set of patterns incapable of being manufactured. A machine learning model is trained using the plurality of IC patterns. The machine learning model generates a prediction model for validating IC layouts. The prediction model receives data including a set of test patterns having SEM images of IC patterns. Design violations associated with an IC layout are determined based on the SEM images and the plurality of IC patterns. A summary of the design violations is provided for further characterization of the IC layout.

In another embodiment, a computer-implemented method includes receiving, by a prediction model, data comprising a set of test patterns having SEM images of IC patterns. The prediction model is generated by a trained machine learning model. The trained machine learning model is trained using a plurality of IC patterns having a first set of patterns capable of being manufactured and a second set of patterns incapable of being manufactured. Design violations associated with an IC layout are determined based on the SEM images and the plurality of IC patterns. A summary of the design violations is provided for further characterization of the IC layout.

In yet another embodiment, a computer-implemented method includes collecting a plurality of IC patterns that include a first set of patterns capable of being manufactured and a second set of patterns incapable of being manufactured. A machine learning model is trained using the plurality of IC patterns. The machine learning model generates a prediction model for validating IC layouts, wherein the prediction model is used to design violations associated with an IC layout based on a set of test patterns comprising SEM images of IC patterns and the plurality of IC patterns.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
a machine learning component configured to generate a prediction model, wherein the prediction model is configured to determine design violations associated with an IC layout by:
generating a compilation of a first set of pixel patterns capable of being manufactured and a second set of pixel patterns incapable of being manufactured;
determining a confidence score associated with a first pixel pattern of the IC layout, wherein the confidence score is associated with how confident the prediction model is in classifying the first pixel pattern as corresponding to either a pattern capable of being manufactured or a pattern incapable of being manufactured, based on features of the first and second sets of pixel patterns learned by the prediction model;
when the confidence score is below a threshold value, classifying the first pixel pattern into a third set of pixel patterns whose manufacturability is uncertain; and
identifying differences between the IC layout with the first set of pixel patterns and the second set of pixel patterns.

2. The system of claim 1, wherein the prediction model is further configured to receive the IC layout.

3. The system of claim 1, wherein the prediction model is further configured to:
determine a second confidence score associated with a second pixel pattern of the IC layout;
identify, based on the second confidence score being below a threshold, the second pixel pattern not belonging to the first set of pixel patterns or the second set of pixel patterns;
determine whether the second pixel pattern is capable of being manufactured; and
updating the first set of pixel patterns or the second set of pixel patterns to include the second pixel pattern.

4. The system of claim 3, wherein the machine learning component is further configured:
to be re-trained with the updated first set of pixel patterns or the updated second set of pixel patterns; and
to re-generate a new prediction model.

5. The system of claim 1, wherein design violations of a pixel pattern of the first or second set of pixel patterns are determined using image processing of the IC layout, the first set of pixel patterns, and the second set of pixel patterns.

6. The system of claim 1, wherein the IC layout is evaluated using design rule check (DRC) code.

7. The system of claim 1, wherein, upon receiving a verification input indicating whether a pixel pattern in the third set of pixel patterns is capable of being manufactured or incapable of being manufactured, the prediction model is further configured to:
update the compilation of the first and second sets of pixel patterns to include the verified pixel pattern from the third set of pixel patterns; and
increase a confidence score associated with the verified pixel pattern to a value above the threshold value.

8. A device comprising:
a prediction model configured to determine design violations associated with an IC layout by:
generating a compilation of a first set of pixel patterns capable of being manufactured and a second set of pixel patterns incapable of being manufactured;
determining a confidence score associated with a first pixel pattern of the IC layout, wherein the confidence score is associated with how confident the prediction model is in classifying the first pixel pattern as corresponding to either a pattern capable of being manufactured or a pattern incapable of being manufactured, based on features of the first and second sets of pixel patterns learned by the prediction model;
when the confidence score is below a threshold value, classifying the first pixel pattern into a third set of pixel patterns whose manufacturability is uncertain; and
identifying differences between the IC layout with the first set of pixel patterns and the second set of pixel patterns.

9. The device of claim 8, wherein the prediction model is further configured to receive the IC layout.

10. The device of claim 8, wherein the prediction model is further configured to:
determine a second confidence score associated with a second pixel pattern of the IC layout;
identify the second pixel pattern not belonging to the first set of pixel patterns or the second set of pixel patterns based on the second confidence score being below a threshold;
determine whether the second pixel pattern is capable of being manufactured; and
update the first set of pixel patterns or the second set of pixel patterns to include the second pixel pattern.

11. The device of claim 10, wherein:
a trained machine learning component is configured to generate the prediction, and
the machine learning component is further configured to be re-trained with the updated first set of pixel patterns or the updated second set of pixel patterns; and
the re-trained machine learning component is configured to re-generate a new prediction model.

12. The device of claim 8, wherein the second set of pixel patterns include defect hotspots.

13. The device of claim 8, wherein design violations of a pixel pattern of the first or second set of pixel patterns are determined using image processing of the IC layout, the first set of pixel patterns, and the second set of pixel patterns.

14. The device of claim 8, wherein the IC layout is evaluated using design rule check (DRC) code.

15. A method comprising:
determining design violations associated with an IC layout by:
generating a compilation of a first set of pixel patterns capable of being manufactured and a second set of pixel patterns incapable of being manufactured;
determining a confidence score associated with a first pixel pattern of the IC layout, wherein the confidence score is associated with how confident a prediction model is in classifying the first pixel pattern as corresponding to either a pattern capable of being manufactured or a pattern incapable of being manufactured, based on features of the first and second sets of pixel patterns learned by the prediction model;
when the confidence score is below a threshold value, classifying the first pixel pattern into a third set of pixel patterns whose manufacturability is uncertain; and
identifying differences between the IC layout with the first set of pixel patterns and the second set of pixel patterns.

16. The method of claim 15, further comprising:
determining a second confidence score associated with a second pixel pattern of the IC layout;
identifying, based on the second confidence score being below a threshold, the second pixel pattern not belonging to the first set of pixel patterns or the second set of pixel patterns;
determining whether the second pixel pattern is capable of being manufactured; and
updating the first set of pixel patterns or the second set of pixel patterns to include the second pixel pattern based on the determination.

17. The method of claim 16, further comprising:
training a machine learning model;
generating the prediction model by the machine learning model;
re-training the machine learning model with the updated first set of pixel patterns or the updated second set of pixel patterns; and
re-generating, by the re-trained machine learning model, a new prediction model.

18. The method of claim 15, wherein the second set of pixel patterns include defect hotspots.

19. The method of claim 15, wherein design violations of a pixel pattern of the first or second set of pixel patterns are determined using image processing of the IC layout, the first set of pixel patterns, and the second set of pixel patterns.

20. The method of claim 15, wherein design violations of a pixel pattern of the first or second set of pixel patterns are determined based on a plurality of IC patterns and by using design rule check (DRC) code comprising a plurality of rules defining layout geometry for the plurality of IC patterns.

* * * * *